(No Model.)

W. M. HARRIS.
Spring-Vehicle.

No. 228,462.    Patented June 8, 1880.

Witnesses
Nat. E. Oliphant,
Geo. R. Porter

Inventor
William M. Harris
per Chas. H. Fowler,
Attorney

United States Patent Office.

WILLIAM M. HARRIS, OF DAVENPORT, IOWA, ASSIGNOR OF ONE-HALF OF HIS RIGHT TO GEORGE SHADO, OF SAME PLACE.

SPRING-VEHICLE.

SPECIFICATION forming part of Letters Patent No. 228,462, dated June 8, 1880.

Application filed March 23, 1880. (No model.)

*To all whom it may concern:*

Be it known that I, WILLIAM M. HARRIS, a citizen of the United States, residing at Davenport, in the county of Scott and State of Iowa, have invented certain new and useful Improvements in Spring-Vehicles; and I do hereby declare that the following is a full, clear, and exact description of the same, reference being had to the annexed drawings, making a part of this specification, and to the letters and figures of reference marked thereon.

Figure 1:
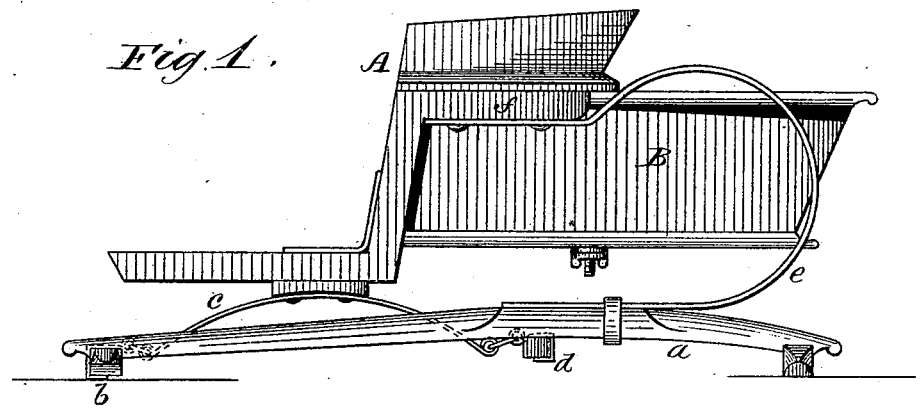
Figure 2:
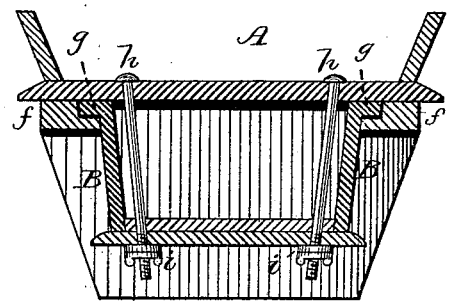

Figure 1 of the drawings is a side elevation of my invention, and Fig. 2 is a cross-section of the seat and box or body.

The present invention has relation to certain new and useful improvements in buggies and other like vehicles wherein the body or box is adapted to be removed when required.

The invention consists in the peculiar manner of connecting the seat by springs to the side bars and bolster of the frame, and also the body or box to the seat, whereby it can be conveniently removed and replaced when found desirable, as will be hereinafter described, and subsequently pointed out in the claims.

In the accompanying drawings, $a$ represents the side bars, and $b$ the bolster, forming the frame of the vehicle.

The seat A is of the usual construction, and is supported by side springs, $c$, the same being connected to the under side of the foot-board of the seat. The forward ends of the springs $c$ are connected by swinging shackles to the bolster $b$, and the rear ends in a similar manner to a cross-brace, $d$.

The seat A, at its rear end, is supported by C-springs $e$, composed of a single leaf, fastened rigidly at their upper ends to the seat A and at their lower ends to the side bars, $a$.

To the seat A is detachably connected the body or box B, which may be of any desirable shape, and, if preferred, it may be provided with a cover or lid and used as a traveling trunk.

The seat A, upon its under side, has grooved flanges $f$, or simply flanges, which, together with the under side of the seat, form grooves or recesses for the reception of flanges $g$ upon the outer sides of the box B, whereby the latter is firmly held to the seat A by the addition of bolts $h$ and nuts $i$, said bolts passing through the seat and box, and fastened by the nuts $i$ engaging with the screw-threaded ends of the bolts, which project below the bottom of the box. This manner of connecting the box B to the seat A renders the box firm and rigid, while it may be readily removed by withdrawing the bolts.

When used as a track or trotting wagon, or when the roads are muddy, it is desirable that the box B should be detached from the seat. The springs $e$, therefore, are deemed of great importance in that class of vehicles in which the body or box is removable, as the peculiar form of springs is better adapted to the purpose than any other, as when the box B is removed the seat A is not only evenly supported at its rear end, but a more perfect spring-seat is obtained, as it should be understood that both the springs are composed of single leaves, and not with several leaves to stiffen them up, and connected to the seat by shackles, as heretofore.

The springs $c$ not only perform their functions as springs, but act as equalizers for the springs $e$, serving or having the effect to carry the body square and level.

Having now fully described my invention, what I claim as new, and desire to secure by Letters Patent, is—

1. The spring-seat A, having flanges $f$, in combination with the detachable or removable body or box B, with flanges $g$, and the means of holding said box to the seat by the bolts $h$ passing through the seat and box and secured by nuts $i$, substantially as set forth.

2. The seat A, connected to the side bars, $a$, at its rear end by single-leaf C-springs $e$, and at its front end to the bolster $b$ by springs $c$, substantially as and for the purpose specified.

3. The seat A, supported by springs $c\ e$, as described, said seat having connected thereto a removable or detachable body or box, B, substantially as and for the purpose described.

In testimony that I claim the above I have hereunto subscribed my name in the presence of two witnesses.

WILLIAM M. HARRIS.

Witnesses:
W. H. WILSON,
CHAS. H. ADE.